United States Patent
Lammers et al.

(10) Patent No.: US 9,511,486 B2
(45) Date of Patent: Dec. 6, 2016

(54) SEAL INSTALLATION GUIDE SLEEVE

(71) Applicant: DEERE & COMPANY, Moline, IL (US)

(72) Inventors: Eric T. Lammers, Cedar Falls, IA (US); Allan N. Schott, Reinbeck, IA (US); Blake A. Metz, Waterloo, IA (US)

(73) Assignee: DEERE & COMPANY, Moline, IL (US)

( * ) Notice: Subject to any disclaimer, the term of this patent is extended or adjusted under 35 U.S.C. 154(b) by 121 days.

(21) Appl. No.: 14/219,242

(22) Filed: Mar. 19, 2014

(65) Prior Publication Data
US 2015/0267815 A1    Sep. 24, 2015

(51) Int. Cl.
*F16J 15/32*    (2016.01)
*B25B 27/00*   (2006.01)

(52) U.S. Cl.
CPC ........ *B25B 27/0028* (2013.01); *F16J 15/3268* (2013.01)

(58) Field of Classification Search
CPC ........... B25B 13/48; B25B 27/00; B25B 27/14
USPC ......................................... 277/551, 571, 577
See application file for complete search history.

(56) References Cited

U.S. PATENT DOCUMENTS

| | | | | |
|---|---|---|---|---|
| 853,973 A | * | 5/1907 | Hannon ............... | B25B 27/0028 29/222 |
| 3,030,702 A | * | 4/1962 | Fowler ................ | B25B 27/0028 29/280 |
| 4,815,884 A | * | 3/1989 | Halliday, Jr. ....... | B25B 27/0028 277/551 |
| 6,220,600 B1 | * | 4/2001 | Tripathy ................ | F16J 15/324 277/309 |
| 7,059,608 B2 | * | 6/2006 | Ramsay ............... | F16J 15/3268 277/551 |
| 2005/0016330 A1 | * | 1/2005 | Stahnke ................ | B25B 13/488 81/176.15 |
| 2005/0251982 A1 | * | 11/2005 | Lackowski, II .... | B25B 27/0028 29/235 |
| 2010/0192344 A1 | * | 8/2010 | Zollmann ........... | F16B 23/0007 29/256 |

FOREIGN PATENT DOCUMENTS

FR    2992247 A1 *  12/2013  ......... B25B 27/0028

* cited by examiner

*Primary Examiner* — Kristina Fulton
*Assistant Examiner* — L. Susmitha Koneru

(57) ABSTRACT

A seal installation guide sleeve for installing a radial lip seal onto a shaft. The radial lip seal includes a flexible sealing lip. The guide sleeve includes a cylindrical lip engaging surface, and includes an annular flange portion extending from the cylindrical lip engaging surface. The guide sleeve also includes a plurality of tabs extending from the annular flange portion. The guide sleeve is pre-installed in the radial lip seal such that the flexible sealing lip engages the cylindrical lip engaging surface, thereby protecting the flexible sealing lip from damage as the radial lip seal is installed onto the shaft.

14 Claims, 4 Drawing Sheets

SEAL INSTALLATION GUIDE SLEEVE

FIELD OF THE DISCLOSURE

The present disclosure relates to a seal installation guide sleeve. More particularly, the present disclosure relates to a seal installation guide sleeve for installing a radial lip seal onto a shaft.

BACKGROUND OF THE DISCLOSURE

Radial lip seals are used in many locations in typical drivetrains. One problem sometimes associated with radial lip seals is that an elastomeric lip thereof may be scratched, cut, or torn as it is installed (i.e., slid) over a shaft with splines or grooves. To prevent such damage, a steel assembly cone may be placed over the shaft so as to protect the radial lip seal. The assembly cone, however, tends to become worn as it is used and handled, resulting in damage thereto. And when the assembly cone is damaged, it tends to harm the radial lip seal, rather than protect it. Often times, it is difficult to regularly monitor the assembly cone for such damage, and even if the damage is spotted, assemblers may be too busy to make repairs. Another issue associated with the assembly cone is that as the radial lip seal is slid over it, a flexible sealing lip of the radial lip seal may roll backwards, resulting in poor assembly quality and sealing performance. And yet another issue associated with the assembly cone is that the assembler may install the radial lip seal backwards, again resulting in poor assembly quality and sealing performance.

SUMMARY OF THE DISCLOSURE

Disclosed is a seal installation guide sleeve for installing a radial lip seal onto a shaft. The radial lip seal includes a flexible sealing lip. The guide sleeve includes a cylindrical lip engaging surface, and includes an annular flange portion extending from the cylindrical lip engaging surface. The guide sleeve also includes a plurality of tabs extending from the annular flange portion. The guide sleeve is pre-installed in the radial lip seal such that the flexible sealing lip engages the cylindrical lip engaging surface, thereby protecting the flexible sealing lip from damage as the radial lip seal is installed onto the shaft.

Using the guide seal eliminates the need for an assembly cone and the issues associated therewith. For example, using the guide sleeve prevents rolling of the flexible sealing lip of the radial lip seal during installation thereof. And, additionally, using the guide sleeve prevents assemblers from installing the lip seal backwards, as a result of the insertion of the seal installation guide sleeve into the radial lip seal being intuitively in one direction.

BRIEF DESCRIPTION OF THE DRAWINGS

The detailed description of the drawings refers to the accompanying figures in which.

DETAILED DESCRIPTION OF THE DRAWINGS

Figure 1:
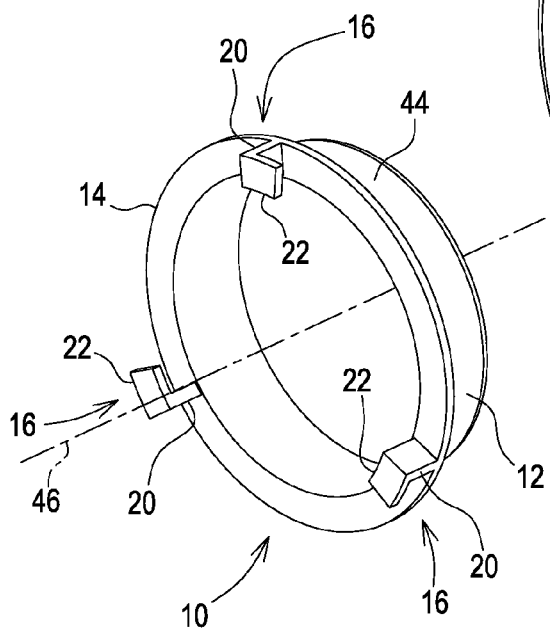
FIG. 1 is a perspective view of a seal installation guide sleeve.
Figure 2:
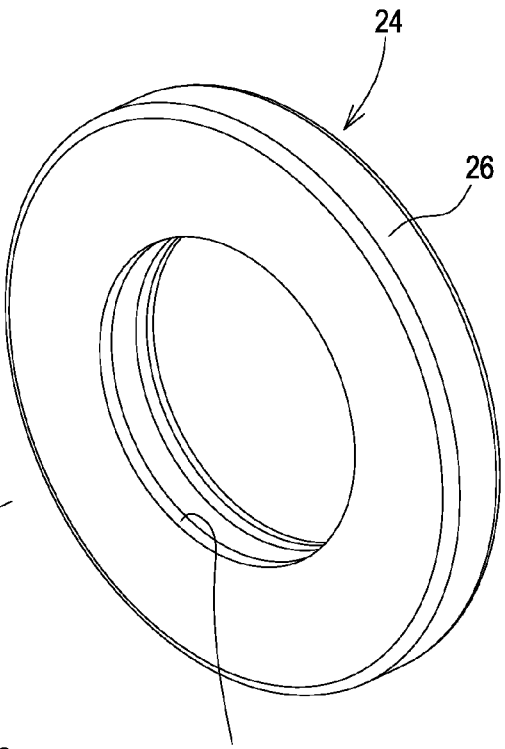
FIG. 2 is a perspective view of a radial lip seal for use with the installation guide sleeve.

Referring to FIGS. 1-5, there is disclosed a seal installation guide sleeve 10 for installing a radial lip seal 24 onto a shaft 38. The radial lip seal 24 includes a flexible sealing lip 30. The guide sleeve 10 includes a cylindrical lip engaging surface 12, and includes an annular flange portion 14 extending from the cylindrical lip engaging surface 12. The guide sleeve 10 also includes a plurality of tabs 16 extending from the annular flange portion 14. The guide sleeve 10 is pre-installed in the radial lip seal 24 such that the flexible sealing lip 30 engages the cylindrical lip engaging surface 12, thereby protecting the flexible sealing lip 30 from damage as the radial lip seal 24 is installed onto the shaft 38. A rubber dust excluder (not shown) may be positioned on an opposite side of the radial lip seal 24, as compared to a side on which the flexible sealing lip 30 is positioned. The guide sleeve 10 is provided so that it may be pre-installed into the radial lip seal 24, prior to being placed on the shaft 38. The guide sleeve 10 sits under the radial lip seal 24, so as to protect it from any harmful features that may be on the shaft 38 (e.g., burrs, splines, steps). After the radial lip seal 24 is installed into a housing 48 (e.g., a PTO housing), for example, the guide sleeve 10 is removed and either thrown away, recycled, or reused, depending on the specific manufacturing process.

As illustrated, the plurality of tabs 16 may be three tabs spaced 120° apart from one another. In another example, the plurality of tabs 16 may be just two tabs spaced 180° apart from one another. Two tabs may allow an operator to remove the guide sleeve 10 manually with his or her hands, rather than with an installation tool 32, for example. Ultimately, the plurality of tabs 16 may be any other number of tabs, depending on, for example, the kind of installation tool 32 or assembly process.

In the illustrated embodiment, the plurality of tabs 16 are all be orientated in a same direction relative to an axis 46 defined by the cylindrical lip engaging surface 12. The plurality of tabs 16 may each include a first leg 20 engaged to the annular flange portion 14, and a second leg 22 angularly disposed from the first leg 20. As illustrated, the first leg 20 and the second leg 22 may be angularly disposed 90° relative to one another, though in other embodiments, they may be oriented differently. Exemplarily, the plurality of second legs 22 may be perpendicular to the axis 46.

During installation of the radial lip seal 24, the plurality of tabs 16 matingly engage a plurality of lugs 34 of the installation tool 32. As shown, the plurality of tabs 16 and the lugs 34 may engage one another by rotating the installation tool 32. And in contrast, the guide sleeve 10 may then readily removed from the installation tool 32 by rotating the installation tool 32 relative to the guide sleeve 10, allowing the tabs 16 to disengage the lugs 34. The guide sleeve 10 may be manufactured from a recyclable material, such as polypropylene, to name just one example. Regardless of the material used, the guide sleeve 10 may either reused, thrown away, or recycled, depending on the specific manufacturing process.

An inner diametrical surface 42 of the cylindrical lip engaging surface 12 may not radially overlap any radial inner portions of the plurality of tabs 16. Otherwise, as the guide sleeve 10 is installed onto the shaft 38, the plurality of tabs 16 and the shaft 38 may interfere with one another, thereby preventing the installation of the radial lip seal 24. Additionally, an outer diametrical surface 44 of the cylindrical lip engaging surface 12 may be a substantially smooth surface, a substantially smooth surface being one that does not damage the radial lip seal 24 during installation thereof.

Figure 3:
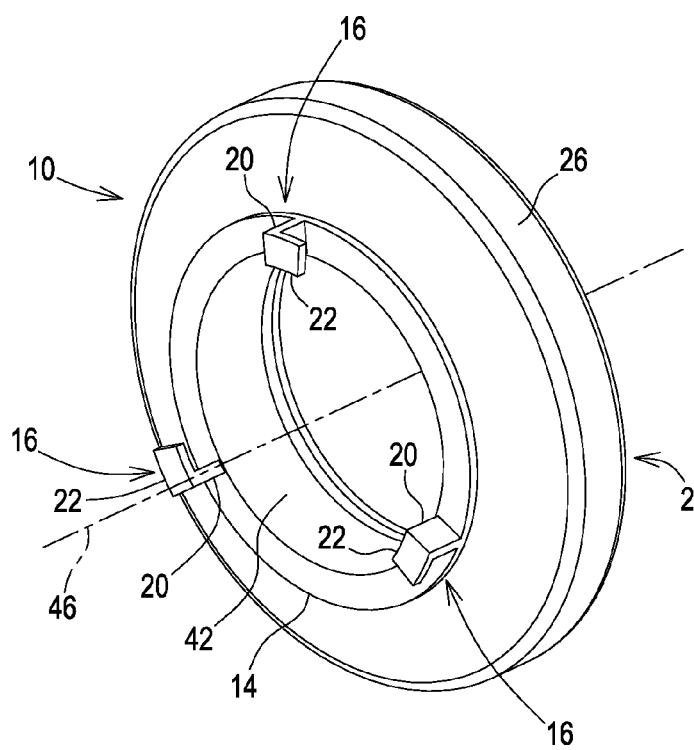
FIG. 3 is a perspective view of the guide sleeve positioned in the radial lip seal.
Figure 4:
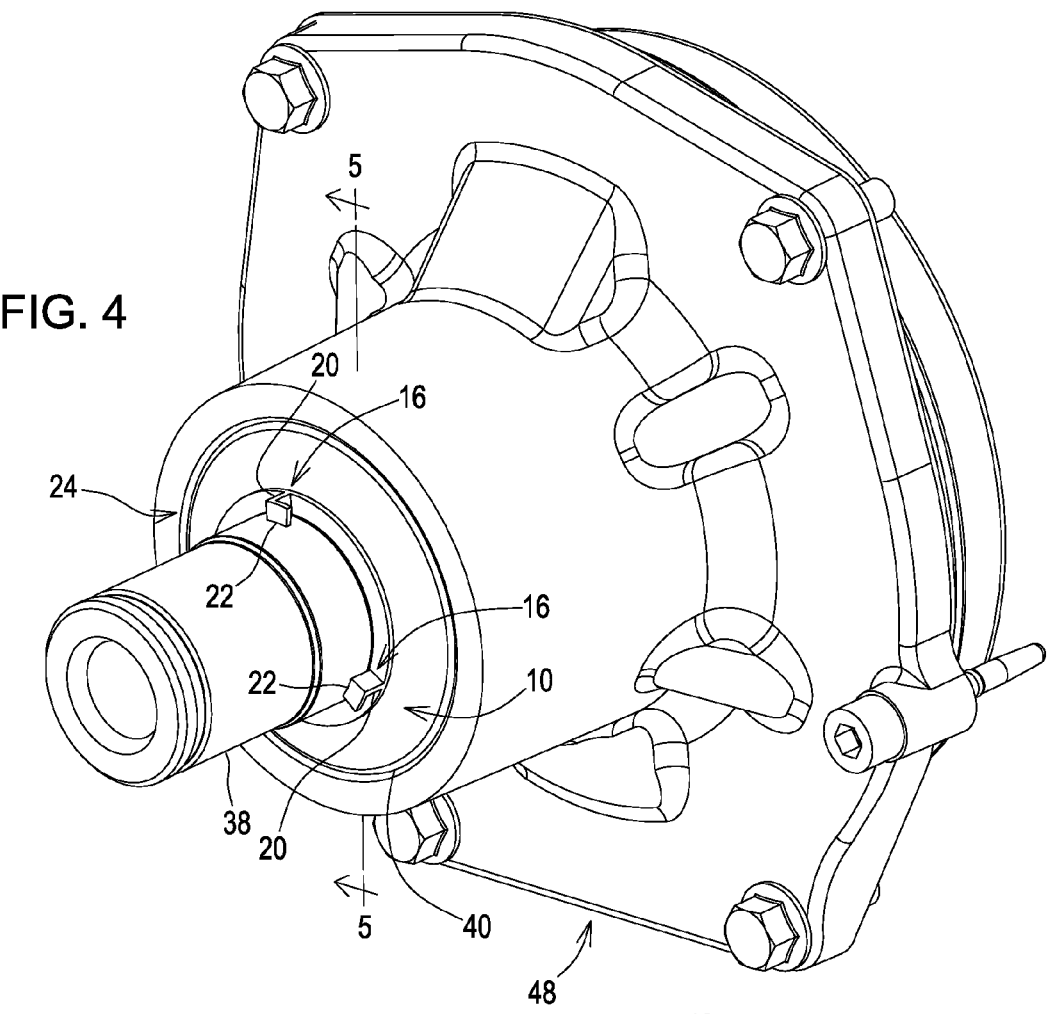
FIG. 4 is a perspective view of the installation tool being used to install the radial lip seal using the guide sleeve.
Figure 5:
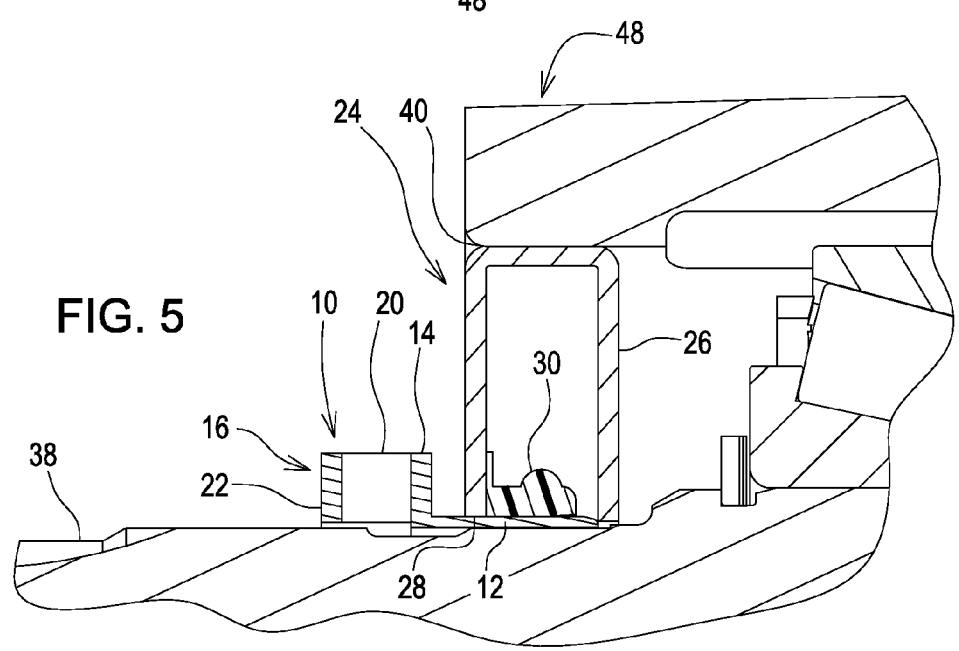
FIG. 5 is an enlarged sectional view, taken along lines 5-5 of FIG. 4, of the installation tool being used to install the radial lip seal using the guide sleeve.

As shown in FIGS. 4 and 5, the radial lip seal 24 includes a rigid cup shaped body 26 with a concentric bore 28 therein. The size of the cup shaped body 26 is selected, so that it may be press fit within a bore 40 of corresponding size, while the flexible sealing lip 30 is selected, so that it may fit in sealing engagement with a shaft 38. As shown, the size of the guide sleeve 10 is selected to closely approximate, but slidingly fit over, a circumferential surface of the shaft 38. Therefore, when the guide sleeve 10 is preassembled to the radial lip seal 24, as shown in FIG. 3, the cylindrical lip engaging surface 12 pre-deforms the flexible sealing lip 30.

Figure 6:
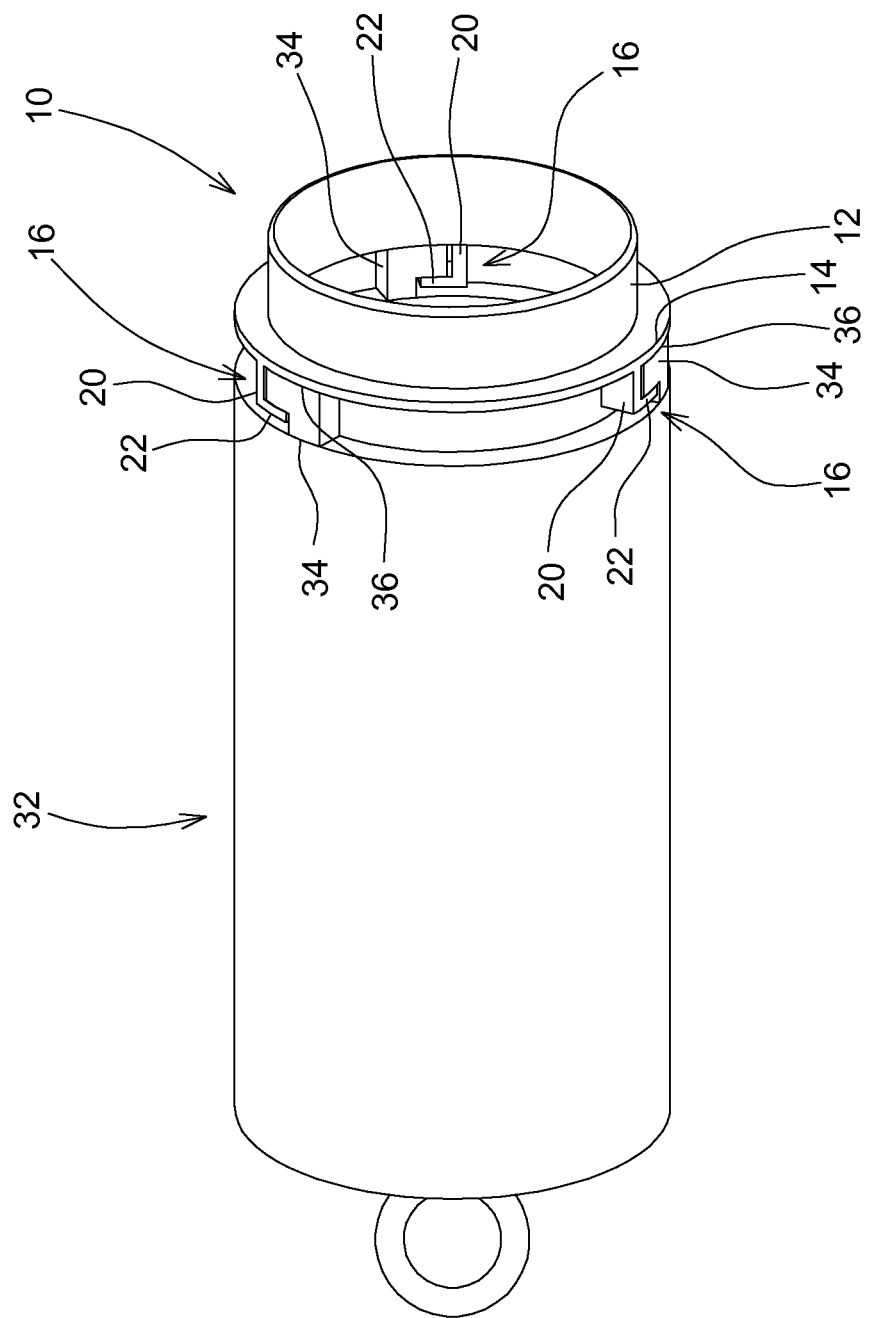
FIG. 6 is a perspective view of an installation tool adapted for use with the guide sleeve.

Referring to FIG. 6, the lugs 34 engage the tabs 16 of the guide sleeve 10, and a pressing surface 36 engages the face of the radial lip seal 24 by way of the annular flange portion 14. In the embodiment shown, the tabs 16 act as the pressing surface 36. During installation, the installation tool 32 presses the radial lip seal 24 and the guide sleeve 10, and ultimately presses the combination over the shaft 38. The pressing surface 36 presses the radial lip seal 24 into the bore 40. The guide sleeve 10 protects the flexible sealing lip 30 from damage by the shaft 38 and allows the radial lip seal 24 to readily slide over the shaft 38. Once the radial lip seal 24 is pressed into the bore 40, the installation tool 32, with the guide sleeve 10 still affixed thereto, is withdrawn leaving behind the radial lip seal 24 in the bore 40.

Figure 7:
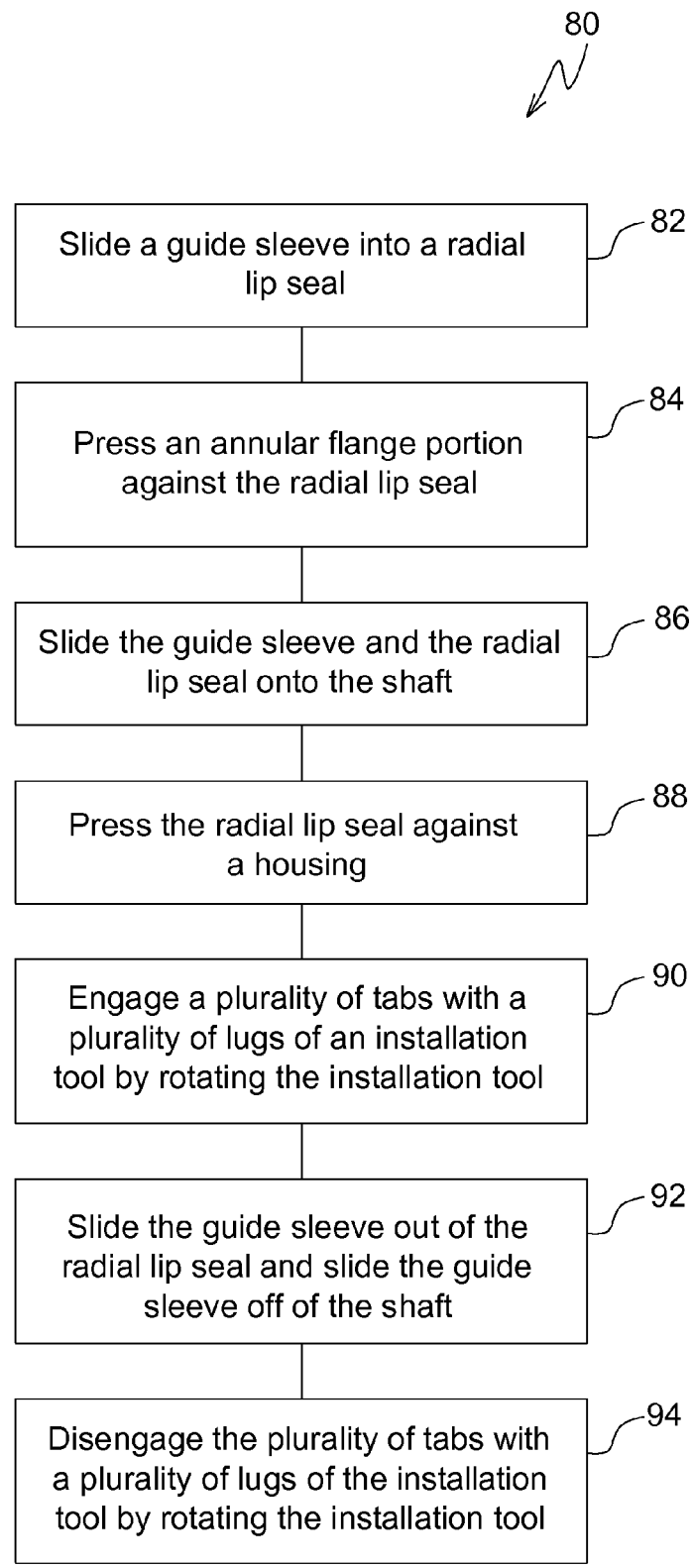
FIG. 7 is a flow chart of a method for installing the radial lip seal onto a shaft using the seal installation guide sleeve.

Referring to FIG. 7, there is shown a method 80 for installing the radial lip seal 24 onto the shaft 38, using the guide sleeve 10. In act 82, a step of pre-installing includes sliding the guide sleeve 10 into the radial lip seal 24, and in act 84, the pre-installing includes pressing the annular flange portion 14 against the radial lip seal 24. Act 86 of the method 80 includes sliding the guide sleeve 10 and the radial lip seal 24 onto the shaft 38. Act 88 includes pressing the radial lip seal 24 against the housing 48. The sliding of the guide sleeve 10 may be completed via the installation tool 32 or by hand, depending on the specific installation procedure.

In act 90, a step of disengaging includes engaging the plurality of tabs 16 with a plurality of lugs 34 of the installation tool 32 by rotating the installation tool 32 (e.g., counterclockwise, in the embodiment shown). In act 92, the disengaging includes sliding the guide sleeve 10 out of the radial lip seal 24 and sliding the guide sleeve 10 off of the shaft 38. In act 94, the disengaging includes disengaging the plurality of tabs 16 from the plurality of lugs 34 by rotating the installation tool 32 (e.g., clockwise, in the embodiment shown). The direction of rotation in act 94 is opposite of the direction of rotation in act 90.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

What is claimed is:

1. A method for installing a radial lip seal onto a shaft using an installation tool having a plurality of lugs, a seal installation guide sleeve, the radial lip seal comprising a cylindrical bore, the guide sleeve comprising a cylindrical lip engaging surface and an annular flange portion extending radially outward from the cylindrical lip engaging surface, a plurality of tabs extending from the annular flange portion, the method comprising:

pre-installing the cylindrical lip engaging surface of the guide sleeve in the cylindrical bore of the radial lip seal;

engaging the lugs of the installation tool and the tabs of the annular flange portion via rotating the installation tool, each of the tabs having a first leg extending axially from the annular flange portion and a second leg angularly disposed from the first leg, each of the lugs having a third leg extending axially from the installation tool and a fourth leg angularly disposed from the third leg and facing the second leg, sliding the guide sleeve and the radial lip seal onto the shaft via the fourth legs of the lugs pressing the annular flange portion, such that an inner diametrical surface of the guide sleeve is in contact with an outer diametrical surface of the shaft;

disengaging the guide sleeve from the radial lip seal via the fourth legs of the lugs pulling on the second legs; and removing the guide sleeve from the shaft, but leaving the radial lip seal on the shaft.

2. The method of claim 1, wherein the pre-installing comprises sliding the guide sleeve into the radial lip seal, such that an outer diametrical surface of the cylindrical lip engaging surface is in contact with an inner diametrical surface of the cylindrical bore.

3. The method of claim 1, wherein the pre-installing comprises pressing the annular flange portion against the radial lip seal.

4. The method of claim 1, comprising pressing and leaving the radial lip seal against a housing.

5. The method of claim 1, wherein the disengaging comprises sliding the guide sleeve out of the radial lip seal and sliding the guide sleeve off of the shaft.

6. The method of claim 1, wherein the disengaging comprises disengaging the plurality of tabs with the plurality of lugs of the installation tool by rotating the installation tool.

7. The method of claim 1, wherein the pre-installing and the disengaging comprise preventing damage to the radial lip seal.

8. The method of claim 1, wherein the pre-installing comprises concentrically surrounding the cylindrical lip engaging surface with the cylindrical bore, such that the cylindrical lip engaging surface and the cylindrical bore are in contact only in a cylindrical region.

9. The method of claim 1, wherein the leaving comprises leaving the radial lip seal on the shaft until a maintenance operation related thereto is required.

10. The method of claim 1, wherein the pre-installing comprises sliding the cylindrical lip engaging surface into the cylindrical bore, such that the cylindrical lip engaging surface does not damage the cylindrical bore.

11. The method of claim 1, wherein the radial lip seal comprises a flexible sealing lip that defines the cylindrical bore, and the pre-installing comprises sliding the cylindrical lip engaging surface into the flexible sealing lip, such that the cylindrical lip engaging surface does not damage the flexible sealing lip.

12. The method of claim 1, wherein engaging the lugs of the installation tool and the tabs of the annular flange portion comprises connecting a bottom surface of each of the fourth legs with the annular flange portion.

13. The method of claim 1, wherein engaging the lugs of the installation tool and the tabs of the annular flange portion comprises connecting an upper surface of each of the fourth legs with the bottom surface of each of the second legs.

14. The method of claim 1, wherein engaging the lugs of the installation tool and the tabs of the annular flange portion comprises connecting an end of each of the fourth legs with each of the first legs.

\* \* \* \* \*